Sept. 26, 1950     C. E. HASTINGS     2,523,297
FREQUENCY METER

Filed Aug. 2, 1945     3 Sheets-Sheet 1

PHOTO-ELECTRIC PICKUP     ALTERNATOR PICKUP

TYPICAL POWER SUPPLY

Inventor
CHARLES E. HASTINGS
By Ralph L. Chappell
Attorney

Sept. 26, 1950  C. E. HASTINGS  2,523,297
FREQUENCY METER

Filed Aug. 2, 1945  3 Sheets-Sheet 2

Inventor
CHARLES E. HASTINGS
By Ralph L. Chappell
Attorney

CHARLES E. HASTINGS
By Ralph L. Chappell
Attorney

Patented Sept. 26, 1950

2,523,297

UNITED STATES PATENT OFFICE 2,523,297

FREQUENCY METER

Charles E. Hastings, Hampton, Va.

Application August 2, 1945, Serial No. 608,546

9 Claims. (Cl. 320—1)

(Granted under the act of March 3, 1883, as amended April 30, 1928; 370 O. G. 757)

This invention relates to a new and useful instrument for the measurement of electrical, magnetic and mechanical frequencies generally known as a frequency meter or as a tachometer, depending upon the application.

More specifically, this invention relates to an instrument for measuring frequencies of electrical or magnetic energy and of any phenomena which can be converted into alternating electrical or magnetic signals. The instrument allows the accurate measurement of frequencies of rotation, vibration or oscillation over a wide range.

Tachometers and frequency meters of service instrument quality that are in use at the present time generally sacrifice some accuracy in order to obtain rugged construction. High quality instruments, designed for high accuracy, are of more delicate construction and require a great deal of maintenance or special techniques. It is the primary object of my invention to provide a novel instrument that will obtain greater accuracy than existing high quality instruments, over a greater range of speeds or frequencies, and that will require considerably less maintenance. It is a further object to provide an instrument that is more adaptable to a wider variety of applications than most existing instruments.

The condenser tachometer is well known as one of the most accurate instruments for measuring speeds of rotating equipment. However, difficulties with insulation resistance, commutator troubles, torque required to turn the commutator, and stray capacitance errors have resulted in no entirely satisfactory commercial applications. It is also well known that serious errors are introduced into this type of instrument because of leads which have stray capacitance, and these stray capacitances are generally seriously affected by temperature, and by the length and position of leads. Since the commutator must maintain very high insulation resistance, a large amount of maintenance is required due to brush dust, dirt, moisture and wear. Condenser tachometers using thyratrons and vacuum tubes for switching, generally known as electronic frequency meters, are well known, but are not suitable for high accuracy work due to variable voltage drop across the tubes. Electronic frequency meters are generally guaranteed by the manufacturers to an accuracy of 2 per cent, and it has been found that at best they are rarely as good as 1 per cent. However, my invention allows accuries of the order of 0.1 per cent or better to be conveniently obtained without adjustment or special techniques.

The features of my invention which I believe to be novel are set forth with particularity in the appended claims. My invention itself, however, both as to its organization and method of operation, together with the objects and advantages thereof may best be understood by reference to the following description:

When used as a tachometer, the instrument consists of a means for generating an alternating current with the same frequency, or any multiple thereof, as the frequency of the system being measured, a novel high speed electromagnetic relay which is operated by this current, two condensers which are alternately charged and discharged by the operation of this relay, and an electrical circuit for determining the average current flowing in the condensers. When the instrument is used as a frequency meter, the first component mentioned above, namely, the means for generating an alternating current with the same frequency as the system being measured, may be disconnected.

In my invention I make use of a novel high speed, double throw relay which allows operation of the frequency meter from the tachometer pick-up or other source of alternating current.

Figure 1:
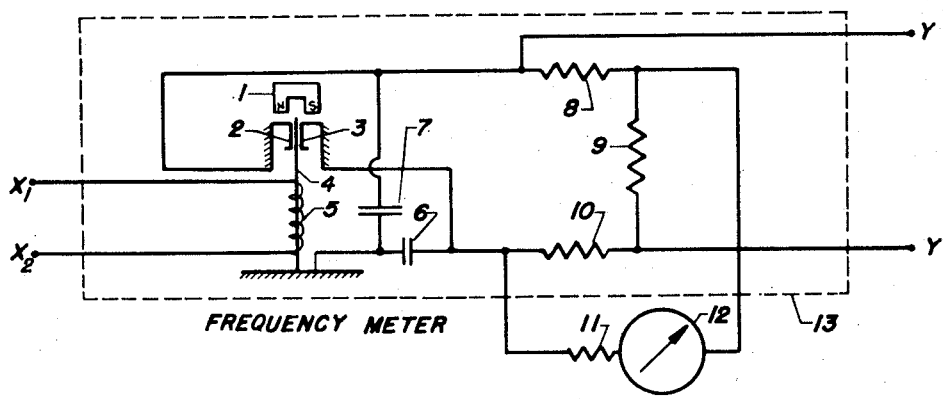
Fig. 1 is a schematic diagram of my frequency meter.

Referring to Fig. 1, the frequency meter which I have developed operates by having alternating current which is applied to terminals $X_1$—$X_2$ low through coil 5 to alternately magnetize leaf 4 in opposite directions, thus causing the free end of the leaf to be attracted to the magnetic leaves 2 and 3 alternately. Leaves 2, 3 and 4 are suitably plated or coated, high permeability magnetic alloys. Leaves 2 and 3 are magnetized with opposite polarity by the permanent magnet 1. Thus for each cycle of alternating current flowing through coil 5, leaf 4 travels from contact 2 to contact 3 and back to contact 2. By alternately contacting leaves 2 and 3, condensers 6 and 7 are alternately charged and discharged in the circuit in which condensers 6 and 7, and resistors 8, 9 and 10 constitute the four arms of a bridge circuit. Power for the latter is applied through terminals Y—Y.

The direct current indicating instrument 12 measures the unbalance in the bridge. Inasmuch as this unbalance is directly proportional to the frequency at which the condensers are charged and discharged, this instrument may be calibrated either in terms of frequency or revolutions per minute. Resistor 11 may be such that the direct current indicating instrument will have even and linear divisions for frequency or revolutions per minute. The novel high speed relay makes possible the use of very short leads in the condenser circuit, thereby reducing stray capacitance errors. The high speed relay also eliminates the troubles that are encountered with commutators in condenser tachometers. The great improvements in the stability of condensers in recent years allows extremely high accuracies to be obtained over a wide range of temperatures. I prefer to provide hermetic sealing 13 of the relay and the condenser bridge to prevent moisture and dirt from affecting the components of the frequency meter and also to reduce or eliminate pitting, oxidation and other deleterious effects on the contacts. The constants of the bridge circuit may be arranged to give full scale deflection for any narrow range of frequency desired so as to be able to obtain a high degree of accuracy with an ordinary D. C. indicating instrument.

The high speed relay is an essential feature of my invention, and the excellent operation of relays built in accordance with the principle described herein makes the invention practical. I prefer to fill the relay housing with liquid for some applications, as I have found that it materially improves its operation in some ranges. It should be obvious to those skilled in the art that very weak input signals may be amplified before being applied to the electro-mechancal version of this relay. However, amplification is generally not required; satisfactory operation has been obtained on less than one milliwatt input.

Any form of tachometer pick-up that gives a suitable alternating electrical or magnetic signal may be used with the frequency meter. However, I prefer to use a photoelectric pick-up which requires no torque from the moving shaft, a simple small alternating current generator which requires negligible torque, or a novel magnetically operated switch which also requires negligible torque.

Figure 4:
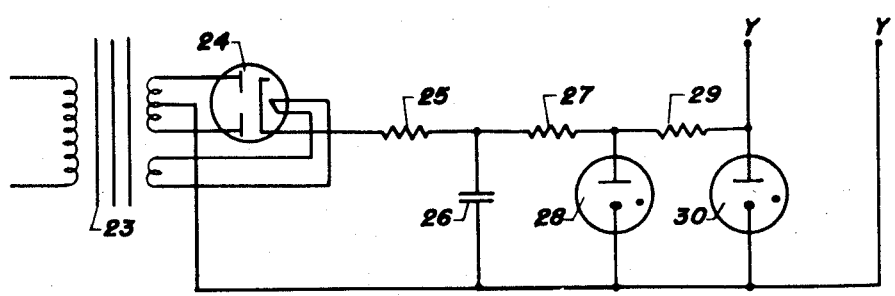
Fig. 4 shows a power supply, which I have developed, that is ideally suited for use with my frequency meter.

Fig. 4 shows a typical power supply which I prefer to use to supply regulated voltage to the frequency meter shown in Fig. 1. This power supply operates by rectifying alternating current by means of transformer 23 and electron tube 24. Resistor 25 and condenser 26 constitute a filter. Resistors 27, 29 and voltage regulator tubes 28 and 30 form a highly effective voltage regulator which supplies direct current power to terminals Y—Y of the frequency meter in Fig. 1. Regulator tube 28 must have a higher voltage rating than voltage regulator tube 30, or two tubes in series may be used in place of tube 28. Voltage regulator tube 28 regulates the supply to voltage regulator tube 30, thus increasing the stability of the voltage supplied by voltage regulator tube 30. This principle can obviously be extended by adding additional voltage regulating stages.

Figures 2, 3:
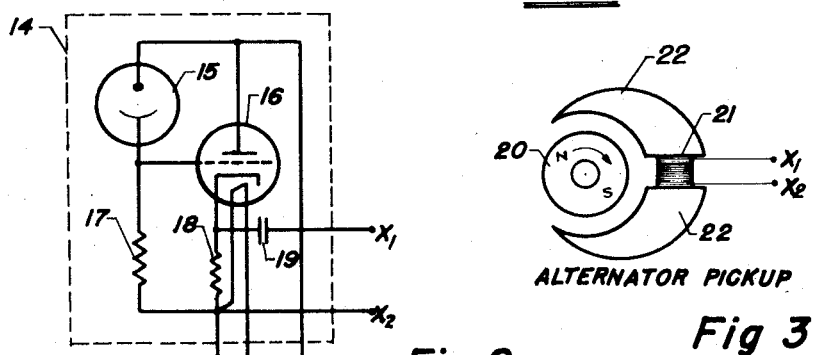
Fig. 2 is a diagram of my photoelectric tachometer pick-up suitable for use with the frequency meter.
Fig. 3 is a diagram of an electric alternator which may also be used, for example, as a tachometer pick-up.

Fig. 2 shows a photoelectric pick-up. Phototube 15 is activated by a fixed light beam which is interrupted by the movement of a rapidly moving member the speed of which is to be measured. The variations in light on phototube 15 in conjunction with grid resistor 17 will cause variations in the grid voltage in the vacuum tube 16. Thus, the current through cathode resistor 18 is caused to vary in proportion to the light falling on phototube 15, thereby producing variations in voltage across resistor 18 which may be applied through terminals $X_1$—$X_2$ to operate the frequency meter heretofore described. The condenser 19 is used to remove direct current components from the output. The variations in light in phototube 15 may be made from reflections of light from alternate light and dark spaces on a rotating shaft, or from interruptions of light by a shutter, for example, by the blades of a propeller on an airplane. I prefer to hermetically seal the photoelectric pick-up to prevent difficulties from moisture, dirt and other factors.

As previously mentioned, an alternator tachometer pick-up operating on the principle represented in Fig. 3 may be used instead of a photoelectric pick-up. This operates by having the permanent magnet 20 alternately cause flux to link coil 21 through pole pieces 22, which are generally made of soft iron, thus generating an alternating current which is applied to terminals $X_1$—$X_2$ to operate the frequency meter shown in Fig. 1. The permanent magnet 20 may be fastened to the rotating member while the coil 21 and pole pieces 22 are mounted in a stationary support.

In addition to the photoelectric and electric alternator forms of pick-up, it is possible to use a magnetic pick-up directly. Referring to Fig. 1, one method for doing this is by rotating a permanent magnet directly adjacent to the lower end of leaf 4 in such a manner that the north and south poles alternately pass close to the leaf, or by otherwise reversing the magnetic flow passing through leaf 4. In similar manner, the frequency meter may be used to measure the frequencies of any oscillating magnetic field by arranging the apparatus such that the flux passing through leaf 4 is reversed once each cycle.

It should be obvious to one skilled in the art that an additional relay similar to the relay shown in Fig. 1 may be placed at a remote location from the frequency meter for use in conjunction with a permanent magnet and a direct current power supply as a tachometer pick-up.

Figure 5:
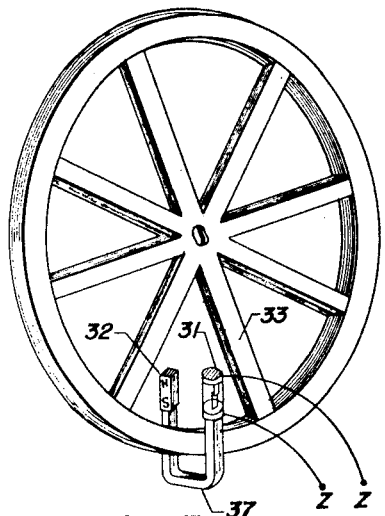
Fig. 5 is a sketch of my magnetic pick-up for remotely operating my frequency meter.

It is also possible to utilize in place of the above mentioned single pole, double throw relay, a single pole, singe throw relay by providing a special direct current power supply which allows the single pole, single throw relay to change direct current into alternating current with a frequency equal to the frequency of operation of the switch. A pick-up that operates in the above fashion but eliminates the need for the permanent magnet on the rotating member is shown in Fig. 5. It comprises, in combination, a novel magnetic switch 31 and a permanent magnet 32, These are so arranged that a projection of ferromagnetic material on the moving object, as typified by the spoke of the wheel 33, passes through the air gap which separates the switch from the permanent magnet, thereby decreasing the amount of magnetic flux that passes through the magnetic switch to a point where the switch contacts open.

Figure 6:
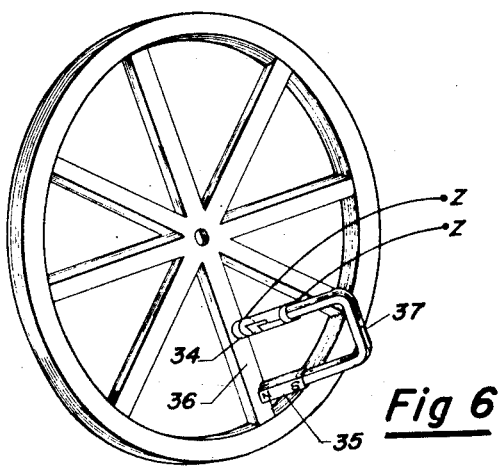
Fig. 6 illustrates another version of magnetic pick-up.

Another typical arrangement may be obtained with a magnetic tachometer pick-up shown in Fig. 6. This arrangement also employs a magnetically operated switch 34 and a permanent magnet 35. With this arrgangement, the magnetic flux passing through the switch is increased if the spoke of the wheel 36 passes close to the ends of the switch and magnet. The sensitivity of this pick-up can be improved by connecting the outer ends of the switch and magnet with a magnetic material 37.

It is obvious in arrangements of the type described in Figs. 5 and 6 that either the interrupted surface or the interruptions in the surface shall be of magnetic material, but not both.

Figure 7:
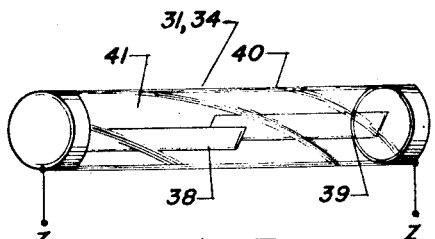
Fig. 7 is an enlarged view of the magnetic switch shown in Figs. 5 and 6.
Figure 8:
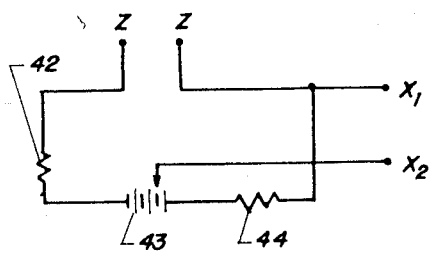
Fig. 8 shows an electric circuit for use with my magnetic tachometer pick-ups to supply square wave alternating current to my frequency meter.

A suitable power supply for the arrangements shown in Figs. 5 and 6 is illustrated in Fig. 8. In this latter figure, the power supply is comprised of a battery 43 and resistors 42 and 44. The magnetically operated switch used in the Fig. 5 and Fig. 6 arrangements, and which switch is shown by Fig. 7, is connected across terminals Z—Z in the Fig. 8 circuit. Thus as the spokes of either of the wheels 33, 36 cut through the magnetic circuit established for the switch, the latter will be alternately opened and closed to effect an alternating potential at the output terminals $X_1$—$X_2$. That is, $X_1$ alternately swings from positive to negative with respect to $X_2$. A typical value of battery 43 would be six volts tapped at 2 volts. Typical values of resistances 42 and 44 would be 1,000 ohms and 2,000 ohms respectively. When the switch in Figure 5 or 6 causes Z—Z of Figure 8 to be short-circuited, a 2-volt drop will result across 42 and a 4-volt drop will result across 44. $X_1$ will therefore be at a potential of minus 2 volts with respect to $X_2$, since the voltage drop of 4 volts across 44 overbalances the 2 volts of the battery. When terminals Z—Z are open circuited, no voltage drop occurs across resistor 44 and $X_1$ will be at a potential of 2 volts positive with respect to $X_2$. Thus, if Z—Z is alternately shorted, a square wave voltage is generated by the circuit of Figure 8, alternate half cycles being positive and negative.

An enlarged view of one of my magnetic switches which can be used in my magnetic tachometer pick-up is shown in Fig. 7. It employs two strips of thin flexible material 38 and 39 of high permeability mounted as cantilever beams with a small air gap between the free ends. The beams are so arranged that the lines of flux in the magnetic field which is employed to actuate the switch will enter at the fixed end of one of the beams, flow along the beam, through the air gap into the other beam, along this beam and out through the fixed end of this beam. The flux flowing across the air gap causes the ends of the beams to be attracted to each other with sufficient force to establish good electrical contact. I prefer to apply a suitable coating or plating such as silver to the beams to improve the contact properties. I also prefer to provide a hermetically sealed enclosure 40 for the switch and to fill this enclosure with a fluid 41 such as silicone oil to reduce the possibility of vibration effects, increase the contact rating, and to prevent contact bouncing or chatter.

Figure 9:
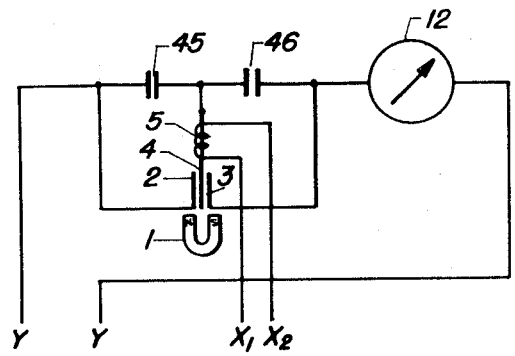
Figs. 9, 10 and 11 are schematic diagrams of modifications of the frequency meter shown in Fig. 1.
Figure 10:
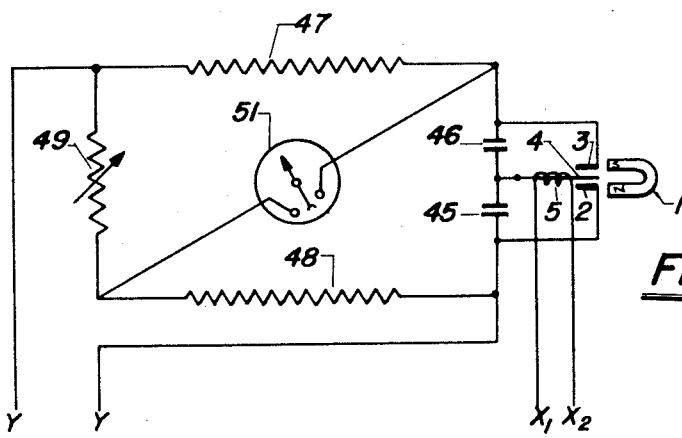
Figure 11:
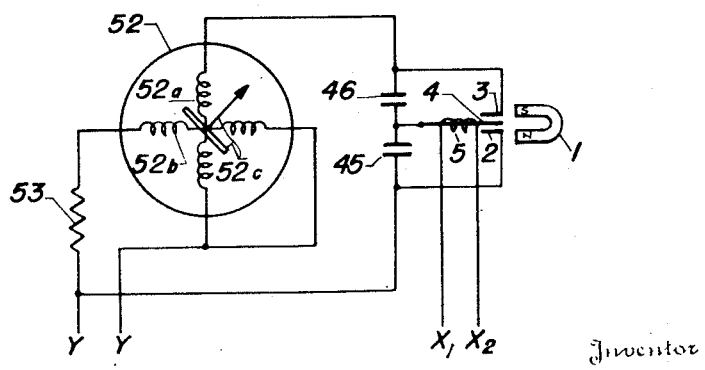

Reference is now made to Figs. 9, 10 and 11 which illustrate modifications of the frequency meter shown in Fig. 1. In all of Figs. 1, 9, 10 and 11, two condensers are used, as distinguished from the single condenser component used previously in commutator condenser tachometers, and the arrangement is such that each time that the magnetic relay is actuated to first one contact and then the other, one of the condensers is discharged while the other is charged. This arrangement doubles the current flow in the frequency indicator meter without increasing the time constant of the measuring circuit. Furthermore, any of the Figs. 1, 9, 10 and 11 arrangements results in twice the number of pulses being supplied to the frequency indicator which reduces the tendency of the latter to vibrate in the lower range of frequencies to be measured. The effective insulation resistance is also increased by the condensers being effectively in series as far as leakage is concerned.

Referring now to Fig. 9, the electromagnetically operated relay is similar to that illustrated in Fig. 1 and includes stationary leaves 2 and 3 magnetized to opposite polarity by permanent magnet 1, and movable leaf 4, the latter being caused to be attracted to the stationary leaves 2 and 3 alternately when alternating current is applied to coil 5. Connected in circuit with the magnetized leaves 2, 3 and 4 are condensers 45 and 46. Leaf 4 is connected to one plate of each of the two condensers 45, 46, leaf 2 is connected to the other plate of condenser 45 and leaf 3 to the other plate of condenser 46. Meter 12 which is a D. C. ammeter and the two condensers 45, 46 form substantially a series circuit which is adapted to be connected via terminals Y—Y to a source of direct current power supply such as that illustrated in Fig. 4. As with the Fig. 1 arrangement, coil 5 is adapted to be connected via terminals $X_1$—$X_2$ to the alternating current of a power line, the frequency of which is to be measured, or to any of the tachometer pick-ups of the general type illustrated in Figs. 2, 3, 5 and 6 that produce an alternating current at a frequency which varies as the frequency of the periodic motion of the object.

In operation of the Fig. 9 arrangement, as leaf 4 is brought alternately into contact with leaves 2 and 3 by the alternating current applied to coil 5, condensers 45 and 46 are alternately charged and discharged from the source of direct current feeding in at terminals Y—Y. It will thus be evident that the average current through meter 12 will be proportional to the number of times per second that condensers 45 and 46 are charged. Since both of these condensers are charged once for each cycle of the electrical frequency or R. P. M. or other periodic motion being measured, the average current flow in the circuit including D. C. ammeter 12 will hence be proportional to the electrical frequency or R. P. M. or other periodic motion and can be so calibrated.

In the Fig. 10 arrangement, it will be seen that the two condensers 45, 46 and the electromagnetically operated relay comprising coil 5 and magnetic leaves 2, 3 and 4 are likewise included. However, in the Fig. 10 arrangement, a bridge circuit is used. The two condensers 45, 46 connected in series constitute one arm of the bridge, and the other three arms are constituted by resistors 47, 48 and 49. Resistors 47 and 48 may be fixed, but resistor 49 is made adjustable. A galvanometer 51 is connected across one pair of bridge diagonals and power is supplied to the other pair of bridge diagonals via terminals Y—Y. In operation, the current flow through the half of the bridge including resistor 47 and condensers 45, 46 will be proportional to the number of times per second that these two condensers are charged. A null method of measurement is employed and hence resistor 49 is adjusted until the current which flows through that half of the bridge including resistor 47 and condensers 45, 46 is equal to the current flowing through the other half of the bridge which includes resistors 48 and 49. Under these conditions, the voltage drop across the bridge diagonals to which galvanometer 51 is connected will be zero and hence meter 51 will then also read zero. The control element for adjusting the value of resistor 49 can thus be calibrated in terms of electrical frequency or R. P. M. as desired. The bridge circuit shown in Fig. 10 may also be used with a deflection meter to expand the indicator scale to indicate only values in a particular range of frequencies, or resistor 49 may be changed and replaced by one of a higher or lower overall resistance to thereby provide multiple indicating ranges.

In the Fig. 11 arrangement, condensers 45, 46 are connected in series with coil 52a of a ratio meter 52. Coil 52b of the ratio meter (at right angles to coil 52a) is connected through resistor 53 to terminals Y—Y which are supplied with direct current power. In operation, as condensers 45, 46 are alternately charged and discharged in response to the change in polarity of the alternating current which is supplied to coil 5 via terminals $X_1$—$X_2$, it will be evident that the magnitude of the current flow through coil 52a of meter 52 will be proportional to the number of times per second that leaf 4 of the magnetic relay moves between leaves 2 and 3, the sum of the capacitances of condensers 45 and 46, and the input D. C. voltage applied to terminals Y—Y. Since the indication of a ratio meter depends upon the ratio of the current in coil 52a to the current in coil 52b, it will be evident that by using condensers of high quality, the scale over which the indicating element 52c of the ratio meter 52 moves can thus be calibrated in terms of the frequency of the alternating current applied to coil 5 of the magnetic relay.

In conclusion, it will be evident that I have provided a novel and highly useful apparatus for accurately determining frequency of motion. The apparatus has many applications and may be used to measure the frequency of an alternating current power source as well as the frequency of any of the different types of periodic motion of an object such as, for example, circular motion and simple harmonic motion.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. In an apparatus for measuring the frequency of periodic motion of an object, the combination comprising means for producing an alternating current at a frequency which varies as the frequency of said motion; a pair of series connected condensers; a source of direct current power; switching means; circuit means connecting said condensers to said power source through said switching means; and circuit means connecting said alternating current to control operation of said switching means in such manner that said condensers will be charged and discharged alternately in accordance with the reversals of said alternating current.

2. In an apparatus for measuring the frequency of periodic motion, the combination comprising a polarized relay having contacts; a pair of series connected condensers; a source of direct current power; circuit means connecting said condensers to said power source through the contacts of said relay; and means for actuating the contacts of said relay at a rate determined by the frequency of said motion in such manner that said condensers are alternately charged and discharged respectively.

3. In an apparatus for measuring the frequency of periodic motion, the combination comprising a polarized relay, said relay including a pair of juxtaposed contacts magnetized to opposite polarities, a third contact mounted for movement between said pair of contacts, and means for alternately magnetizing said third contact to opposite polarities at a rate determined by the frequency of said motion; a pair of series connected condensers; a power source; and circuit means connecting said condensers to said power source through said relay contacts in such manner that each of said condensers is alternately charged and discharged as said third contact alternately engages the first and then the second of said pair of contacts.

4. In an apparatus for measuring the frequency of periodic motion of an object, the combination comprising a polarized relay, said relay including a pair of juxtaposed contacts magnetized to opposite polarities, a third contact mounted for movement between said pair of contacts, and a coil for magnetizing said third contact; means producing an alternating current, the frequency of which is determined by the frequency of said object's periodic motion; circuit means connecting said alternating current to said coil to thereby cause said third contact to alternately engage said juxtaposed contacts; a pair of series connected condensers; a power source; and circuit means connecting said condensers to said power source through said relay contacts in such manner that each of said condensers is alternately charged and discharged as said third contact alternately engages the first and then the second of said pair of contacts.

5. In an apparatus for measuring electrical frequency, the combination comprising a polarized electromagnetic relay; series connected condensers; a source of direct current power; means connecting said source of power in circuit with said condensers through the contacts of said polarized relay; and circuit means connecting the energizing winding of said relay to the source of said electrical frequency to actuate said relay contacts in such manner that said condensers are alternately charged and discharged once for each cycle of said electrical frequency.

6. In an apparatus for measuring frequency of an alternating current, the combination comprising a polarized electromagnetic relay; series connected condensers; a source of direct current power; circuit means connecting said condensers in series with said source of direct current power through the contacts of said relay; and means for actuating the contacts of said relay by said alternating current in such manner that said condensers are alternately charged and discharged once for each cycle of said alternating current.

7. Apparatus for measuring the frequency of periodic motion of an object comprising a magnetic tachometer pick-up, said pick-up including a magnetic switch comprising a pair of overlapped leaves of magnetizable material, said leaves being slightly spaced from each other, and a magnetic field cooperative with said magnetic switch and said object in such manner that the latter in its motion alters the magnetic lines of force from said field passing through the leaves of said magnetic switch at a rate determined by the frequency of said object's motion to thereby cause the leaves of said magnetic switch to alternately become engaged and disengaged with each other; a polarized relay; series connected condensers; a source of direct current power; circuit means connecting said condensers to said power source through the contacts of said relay; and means controlled by the operation of said magnetic switch for controlling operation of the contacts of said polarized relay in such manner that said condensers are alternately charged and discharged.

8. A tachometer for measuring the speed of rotation of an object comprising an alternator pick-up, said pick-up including a permanent magnet adapted to be connected to rotate with said object, a pair of pole pieces cooperative with said rotating magnet to periodically reverse the polarity at the faces of said pole pieces, and a coil disposed between the faces of said pole pieces, said coil having an alternating current induced therein in accordance with the alternations in polarization of the faces of said pole pieces; series connected condensers; and means controlled by said alternating current for alternately charging and discharging said condensers by a rate determined by the reversals of said alternating current.

9. A tachometer for measuring the speed of rotation of an object comprising an alternator pick-up, said pick-up including a permanent magnet adapted to be connected to rotate with said object, a pair of pole pieces cooperative with said rotating magnet to periodically reverse the polarity at the faces of said pole pieces, and a coil disposed between the faces of said pole pieces, said coil having an alternating current induced therein in accordance with the alternations in polarization of the faces of said pole pieces; a polarized relay; series connected condensers; a source of direct current power; circuit means connecting said condensers to said power source through the contacts of said polarized relay; and circuit means connecting the said alternating current produced by said alternator pick-up to said relay to control operation thereof in such manner that said condensers are alternately charged and discharged in accordance with the reversals of said alternating current.

CHARLES E. HASTINGS.

REFERENCES CITED

The following references are of record in the file of this patent:

UNITED STATES PATENTS

| Number | Name | Date |
| --- | --- | --- |
| 996,335 | Hewitt et al. | June 27, 1911 |
| 1,665,857 | Needham | Apr. 10, 1928 |
| 1,809,683 | Fitzgerald | June 9, 1931 |
| 1,834,129 | Loewe | Dec. 1, 1931 |
| 1,871,404 | Brown | Aug. 9, 1932 |
| 1,916,782 | Crossley | July 4, 1933 |
| 2,110,015 | Fitzgerald | Mar. 1, 1938 |
| 2,111,598 | Marrison | Mar. 22, 1938 |
| 2,119,389 | Hunt | May 31, 1938 |
| 2,265,717 | Bedford | Dec. 9, 1941 |
| 2,298,003 | Feingold | Oct. 6, 1942 |
| 2,319,937 | Mathes | May 25, 1943 |
| 2,322,851 | Kalb | June 29, 1943 |
| 2,331,934 | Satterlee | Oct. 19, 1943 |
| 2,333,210 | Stern | Nov. 2, 1943 |